UNITED STATES PATENT OFFICE.

JOHN F. BOYNTON, OF SYRACUSE, NEW YORK.

IMPROVED COMPOSITION FOR ROOFING.

Specification forming part of Letters Patent No. 59,348, dated November 6, 1866.

*To all whom it may concern:*

Be it known that I, JOHN F. BOYNTON, of Syracuse, in the county of Onondaga and State of New York, have invented a new and useful Composition of Matter for Roofing and other like uses; and I hereby declare the following to be a full, clear, and exact description of the same.

Gas-tar as usually obtained from gas-works is a compound or mixture of water, ammonia, and several hydrocarbons holding a large quantity of pitchy material dissolved in them. Water and the elements of ammonia enter largely into all the organic compounds, rendering them liable to become easily decomposed, and to excite decay in the substances with which they are in contact.

Experiments have shown that felt and cloth which have been saturated with crude gas-tar and used for roofing have become decomposed in a short time, and, not having strength enough to hold together the cement, would crumble, and the roof become leaky and useless, while specimens of cloth and felt saturated with the pitchy materials of gas-tar, when the ammoniacal water and other deleterious elements are removed, have remained many years without losing their strength or undergoing any apparent decomposition.

By distillation the ammoniacal water and other objectionable parts are removed, and the remaining hydrocarbons and pitchy substances can be combined with gums, resins, oils, wax, sulphur, bitumen, asphalts, mineral and metallic oxides, silicates, sulphurets, and carbonates, forming cements, paints, varnishes, and many other valuable compounds used in the arts.

When the tar has been properly treated and deprived of its decomposable portions it can be applied to cloth, felt, or paper, causing it to resist the action of the elements for many years without any apparent decay; and actual experiment has proved that where paper, felt, and cloth have been saturated with tar after having received the above-named treatment and been exposed to rains, frosts, snows, heat, cold, and sunshine for several years, and on having its pitchy saturations removed by chemical agents, the fabric was found to be perfectly preserved and apparently as strong as when first saturated.

Having had several years of experience in distilling gas-tars and other hydrocarbons and manufacturing various kinds of roofing materials and cements from the same, I have found that gas-tar should in all cases be deprived of its ammoniacal water and lighter products before being combined with other substances, as they are liable to undergo decay, and thereby cause a disintegration or decomposition of the compound formed.

For manufacturing carboniferous slate roofing material, I place in a strong iron retort any required amount of gas-tar and distill from it all that will come over, until it is deprived of its ammonia and is rendered anhydrous.

When the tar thus treated and left to cool is found to be too thick it can be reduced to the right consistency with the dead-oils previously distilled from gas-tar while manufacturing solid pitch. These oils, having been deprived of water and ammonia, are anhydrous, and will readily combine with thick tar, reducing it to as fluid a condition as desired. Tar prepared in this way may be kept in barrels ready for use and transportation, and when required to be used it is only necessary to pour it out into a bed or bin and thoroughly commingle it with dry ground clay until any desired consistency is obtained, when it may be spread upon the felt of the roof with a trowel in the common way of using lime mortar. These anhydrous materials will in a short time unite, forming a carboniferous slate, adhering firmly to the felt or fabric on which it is laid, and resisting the action of the elements like stone.

My invention consists, first, in preparing gas-tar as described, to be subsequently converted into a roofing-cement by the addition of pulverized clay, the tar thus prepared constituting an article of commerce differing from anything heretofore known or used.

It consists, secondly, in making a new composition of matter for roofing purposes by mixing pulverized clay with gas-tar so prepared.

What I claim, therefore, as my invention, and desire to secure by Letters Patent, is—

1. Gas-tar rendered anhydrous, as described, in combination with the dead-oils distilled from gas-tar, as a material to be used in preparing a roofing-cement by mixing therewith ground clay and other similar substances.

2. As a roofing-cement, a combination of gas-tar rendered anhydrous, as described, with pulverized clay and the dead-oils distilled from gas-tar.

JOHN F. BOYNTON.

Witnesses:
J. J. COOMBS,
EDM. F. BROWN.